United States Patent
Damola et al.

(10) Patent No.: US 9,628,760 B2
(45) Date of Patent: Apr. 18, 2017

(54) PERSONALIZED DATA DISTRIBUTION BASED ON PEER-TO-PEER CONTENT DELIVERY

(75) Inventors: Ayodele Damola, Solna (SE); Apostolos Georgakis, Stockholm (SE); Per Karlsson, Tullinge (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 908 days.

(21) Appl. No.: 13/201,304

(22) PCT Filed: Feb. 24, 2009

(86) PCT No.: PCT/IB2009/000351
§ 371 (c)(1),
(2), (4) Date: Aug. 12, 2011

(87) PCT Pub. No.: WO2010/097647
PCT Pub. Date: Sep. 2, 2010

(65) Prior Publication Data
US 2011/0295981 A1   Dec. 1, 2011

(51) Int. Cl.
*G06F 15/16* (2006.01)
*H04N 7/173* (2011.01)
(Continued)

(52) U.S. Cl.
CPC ..... *H04N 7/17318* (2013.01); *H04N 21/4331* (2013.01); *H04N 21/4622* (2013.01);
(Continued)

(58) Field of Classification Search
CPC .............. H04N 21/63; H04N 21/632; H04N 21/23424; H04N 21/26241; H04L 65/60;
(Continued)

(56) References Cited

U.S. PATENT DOCUMENTS 8,090,798 B2 * 1/2012 Alexander ............. G06Q 30/02
                                                   705/14.4
8,112,361 B2 * 2/2012 Golan et al. ................... 705/54
(Continued)

OTHER PUBLICATIONS

International Search Report for PCT/IB2009/000351 mailed Dec. 2, 2009.
(Continued)

*Primary Examiner* — Dustin Nguyen
(74) *Attorney, Agent, or Firm* — Patent Portfolio Builders PLLC

(57) ABSTRACT

Device, computer program and method for providing video content and data to a user device (50). The method includes providing the video content to the user device (50), sending a first message from a network operator system (40) to the user device (50), the first message including at least one of an instruction for downloading the data or a table (102) storing information about the data, wherein each of the instruction and the information about the data informs the user device (50) to search a peer-to-peer network (70) for the data, and receiving at the network operator system (40) a second message from the user device (50) indicating that the data has been downloaded from the peer-to-peer network (70).

28 Claims, 14 Drawing Sheets

(51) Int. Cl.
  *H04N 21/433*   (2011.01)
  *H04N 21/462*   (2011.01)
  *H04N 21/4788*  (2011.01)
  *H04N 21/63*    (2011.01)
  *H04N 21/647*   (2011.01)
  *H04N 21/6543*  (2011.01)
  *H04N 21/6583*  (2011.01)
  *H04N 21/81*    (2011.01)
  *H04H 60/82*    (2008.01)

(52) U.S. Cl.
  CPC ....... *H04N 21/4788* (2013.01); *H04N 21/632* (2013.01); *H04N 21/64753* (2013.01); *H04N 21/6543* (2013.01); *H04N 21/6583* (2013.01); *H04N 21/812* (2013.01); *H04H 60/82* (2013.01)

(58) Field of Classification Search
  CPC .... H04L 67/00; G06Q 30/02; G06Q 30/0267; G06Q 30/0248
  USPC .......... 705/14.49, 52, 54, 14, 14.4; 709/217, 709/231; 370/238
  See application file for complete search history.

(56) References Cited

U.S. PATENT DOCUMENTS

| | | | |
|---|---|---|---|
| 8,169,916 B1* | 5/2012 | Pai et al. | 370/238 |
| 8,230,037 B2* | 7/2012 | Story et al. | 709/217 |
| 8,341,283 B2* | 12/2012 | Argawal et al. | 709/231 |
| 8,386,630 B1* | 2/2013 | Atzmon | 709/231 |
| 8,548,853 B2* | 10/2013 | Zhang et al. | 705/14.49 |
| 2002/0007350 A1* | 1/2002 | Yen | G06Q 30/0248 705/52 |
| 2004/0148424 A1* | 7/2004 | Berkson | G06Q 30/02 709/236 |
| 2007/0204321 A1 | 8/2007 | Shen et al. | |
| 2007/0277205 A1 | 11/2007 | Grannan | |
| 2008/0004957 A1* | 1/2008 | Hildreth et al. | 705/14 |
| 2008/0301750 A1 | 12/2008 | Silfvast et al. | |
| 2009/0300704 A1 | 12/2009 | Boberg et al. | |

OTHER PUBLICATIONS

Written Opinion for PCT/IB2009/000351 mailed Dec. 2, 2009.
International Preliminary Report on Patentability for PCT/IB2009/000351 mailed May 16, 2011.
www.scopus.net home webpage, "harmonic," downloaded Nov. 5, 2014, originally published in 2002, pp. 1-2.

* cited by examiner

| AD ID | TIME TO PLAY OUT | AD EXPIRY DATE |
|---|---|---|
| AD 1 | 9:15; 10:20, ... | 03/07/2009 |
| AD 2 | ... | ... |
| ... | ... | ... |
| AD N | ... | ... |

PERSONALIZED DATA DISTRIBUTION BASED ON PEER-TO-PEER CONTENT DELIVERY

TECHNICAL FIELD

The present invention generally relates to systems, software and methods and, more particularly, to mechanisms and techniques for providing personalized data to a user device based on a peer-to-peer (P2P) network.

BACKGROUND

During the past years, the evolution of the communication networks and the processors for computing devices such as computers, mobile phones, game consoles, personal digital assistants, etc., has resulted in large bandwidth connections being available in homes and video files being watched on various devices connected to the communication networks. Thus, today it becomes more customarily to watch video content on a computer, to play online games, etc.

One example of a system for transporting video content (for example, TV content) to a computer is the Internet Protocol Television (IPTV). IPTV is a system where a digital television service is delivered using Internet Protocol (IP) over a network infrastructure, which may include delivery by a broadband connection. A general definition of IPTV is television content that, instead of being delivered through traditional broadcast and cable formats, is received by the viewer through the technologies used for computer networks.

IPTV may be supplied by a service provider using a closed network infrastructure. The network infrastructure may be wireless, wired or a combination of the two. When at least a part of the network infrastructure is wireless, more types of user devices may be enabled to receive the IPTV content, i.e., mobile phones or other mobile devices. Similar to the conventional TV, the service provider is able to insert into the video content streams of advertisements that target the audience.

However, it is desired that the advertisements are personalized for the users such that they are more efficient. For example, one way to provide personalized ads for telecommunication IPTV is to insert, based on a device to be discussed next, streams containing advertisements into the main TV stream during time periods allocated to commercials. For this purpose, video slicing equipment may be used. FIG. 1 shows a network architecture of an intelligent video gateway (IVG) 10 that can personalize ads delivery to users. The system 10 shown in FIG. 1 is provided by Scopus Video Networks, Princeton, N.J., USA.

This system 10 includes a master headend 12 and a remote headend 14 connected to the master headend 12. The master headend 12 is configured to communicate with various entities. For example, the master headend 12 is connected to a video server 16 that provides video data. The master headend 12 is also connected to an ITV server 18 for supporting interactive TV. The master headend 12 may be connected to a Network Management System (NMS) 20 for managing traffic from and to the IP network 22. An encoding unit 22 may provide the desired encoding to the master headend 12. The remote headend 14 is connected to a TV set 24, to an ad server 26 and to a local content provider 28. The ad server 26 may store and provide on request desired ads to be distributed by the remote headend 14 to the TV set 24. The local content provider 28 may provide the remote headend 14 with local content to be distributed to the TV set 24.

The IVG 10 shown in FIG. 1 acts as a video stream 'switch' taking as input several video streams and outputting a stream based on a set of operator configured policies. The remote headend 14 of the IVG 10 takes as input not only content from the master headend 12 and local content from the local content provider 28 but also content from the ad server 26. Thus, the IVG 10 enables the delivery of personalized advertisements to users.

However, personalizing the ads distributed to the user is a challenge to the service providers as the granularity of the end viewer is desired to be fine for such systems. The finer the granularity, the more revenue that could be expected by the service providers. If multicast is used to deliver the ad streams, as conventionally performed, then coarse granularity is achieved, which is not desired. Unicast enables achieving a granularity of a single household but the price and infrastructure for this is high as the streaming server would have to serve as many unicast sessions as the number of distinct end viewers. The bandwidth and server scalability requirements of such system would be prohibitively high given the fact that the server needs large bandwidth for both the server needs and for the extra bandwidth incurred in the aggregation network because the server sends multiple unicasts throughout the whole aggregation network.

Another problem with ad insertions into live streams is that the existing equipment required is expensive in both cost and maintenance and requires extensive configuration. Because the ads are inserted in realtime, the reliability of the system is expected to be high, which further increases the cost of such a system.

Accordingly, it would be desirable to provide devices, systems and methods that avoid the afore-described problems and drawbacks.

SUMMARY

Customized data is desired to be provided to individual users of video content without using sophisticated equipment or requiring high bandwidth capabilities between the video content provider and the individual users.

According to an exemplary embodiment, there is a method for providing video content and data to a user device that achieves the goals noted in the above paragraph. The method includes providing the video content to the user device and sending a first message from a network operator system to the user device. The first message includes at least one of an instruction for downloading the data or a table storing information about the data, where each of the instruction and the information about the data informs the user device to search a peer-to-peer network for the data. By using the peer-to-peer network for downloading the data, the traffic between the user device and the network operator system is lower in higher levels of network aggregation. The method further includes receiving at the network operator system a second message from the user device indicating that the data has been downloaded from the peer-to-peer network.

According to another exemplary embodiment, there is a network operator system for providing video content and data to a user device. The system includes an interface configured to provide the video content to the user device and a processor connected to the first interface. The processor sends a first message to the user device, the first message including at least one of an instruction for downloading the data or a table storing information about the data. Each of the instruction and the information about the data informs the user device to search a peer-to-peer network for the data. The processor is also configured to receive a second message from the user device indicating that the data has been downloaded from the peer-to-peer network.

According to still another exemplary embodiment, there is a computer readable medium including computer executable instructions, wherein the instructions, when executed, implement a method for providing video content and data to a user device. The method includes providing a system having distinct software modules, where the distinct software modules include a video content module, a tracker module, and a data control module. The method also includes providing the video content to the user device from the video content module, and sending a first message from a network operator system to the user device. The first message includes at least one of an instruction for downloading the data or a table storing information about the data. Each of the instruction and the information about the data informs the user device to search via the tracker module in a peer-to-peer network for the data. The method also includes receiving at the network operator system a second message from the user device indicating that the data has been downloaded from the peer-to-peer network.

According to another exemplary embodiment, there is a method for receiving video content and data at a user device. The method includes receiving the video content at the user device, and receiving at the user device a first message from a network operator system. The first message includes at least one of an instruction for downloading the data or a table storing information about the data. Each of the instruction and the information about the data informs the user device about searching a peer-to-peer network for the data. The method also includes sending to the network operator system a second message from the user device indicating that the data has been downloaded from the peer-to-peer network.

According to another exemplary embodiment, there is a user device for receiving video content and data. The user device includes a first interface configured to receive the video content and a processor connected to the first interface. The processor is configured to receive a first message from a network operator system. The first message includes at least one of an instruction for downloading the data or a table storing information about the data. Each of the instruction and the information about the data informs the user device about searching a peer-to-peer network for the data. The processor is also configured to send to the network operator system a second message indicating that the data has been downloaded from the peer-to-peer network.

According to still another exemplary embodiment, there is a computer readable medium including computer executable instructions, wherein the instructions, when executed, implement a method for receiving video content and data at a user device. The method includes providing a system having distinct software modules. The distinct software modules include a TV receiving content module, and a peer-to-peer module. The method also includes receiving the video content at the TV receiving content module and receiving at the peer-to-peer module a first message from a network operator system. The first message includes at least one of an instruction for downloading the data or a table storing information about the data. Each of the instruction and the information about the data informs the user device about searching a peer-to-peer network for the data. The method also includes sending to the network operator system a second message from the user device indicating that the data has been downloaded from the peer-to-peer network.

It is an object to overcome some of the deficiencies discussed in the previous section and to provide a host capable of pushing desired data to another host. One or more of the independent claims advantageously provides a reduced traffic load in the network as the data may be exchanged between user devices, which also may reduce/eliminate the presence of a data streaming server in a headed of the network.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of a telecommunication network. However, the embodiments to be discussed next are not limited to this network but may be applied to other networks.

Reference throughout the specification to "one embodiment" or "an embodiment" means that a particular feature, structure, or characteristic described in connection with an embodiment is included in at least one embodiment of the present invention. Thus, the appearance of the phrases "in one embodiment" or "in an embodiment" in various places throughout the specification is not necessarily all referring to the same embodiment. Further, the particular features, structures or characteristics may be combined in any suitable manner in one or more embodiments.

Figure 1:
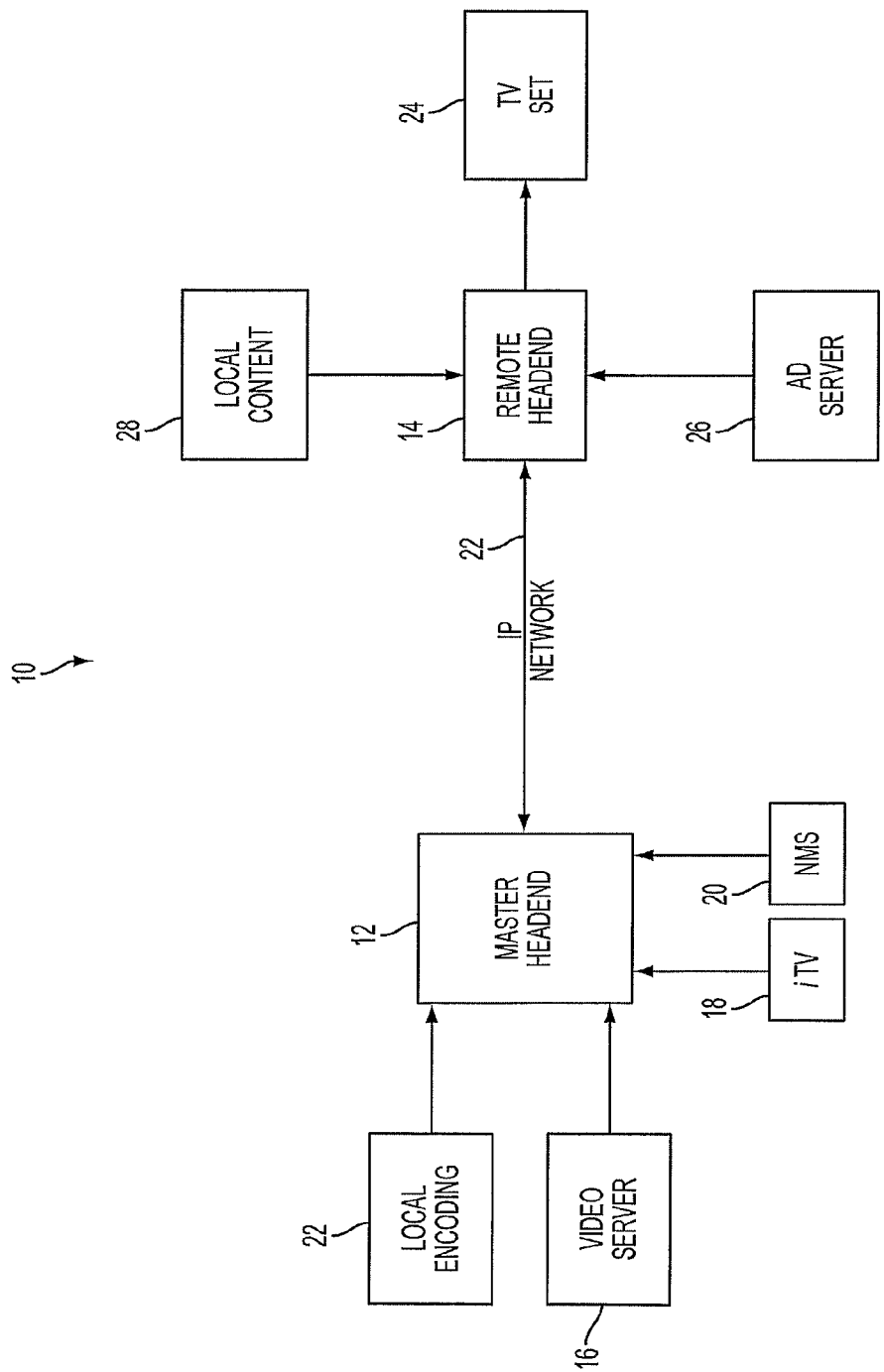
FIG. 1 is a schematic diagram of TV and ad content delivery system.
Figure 2:
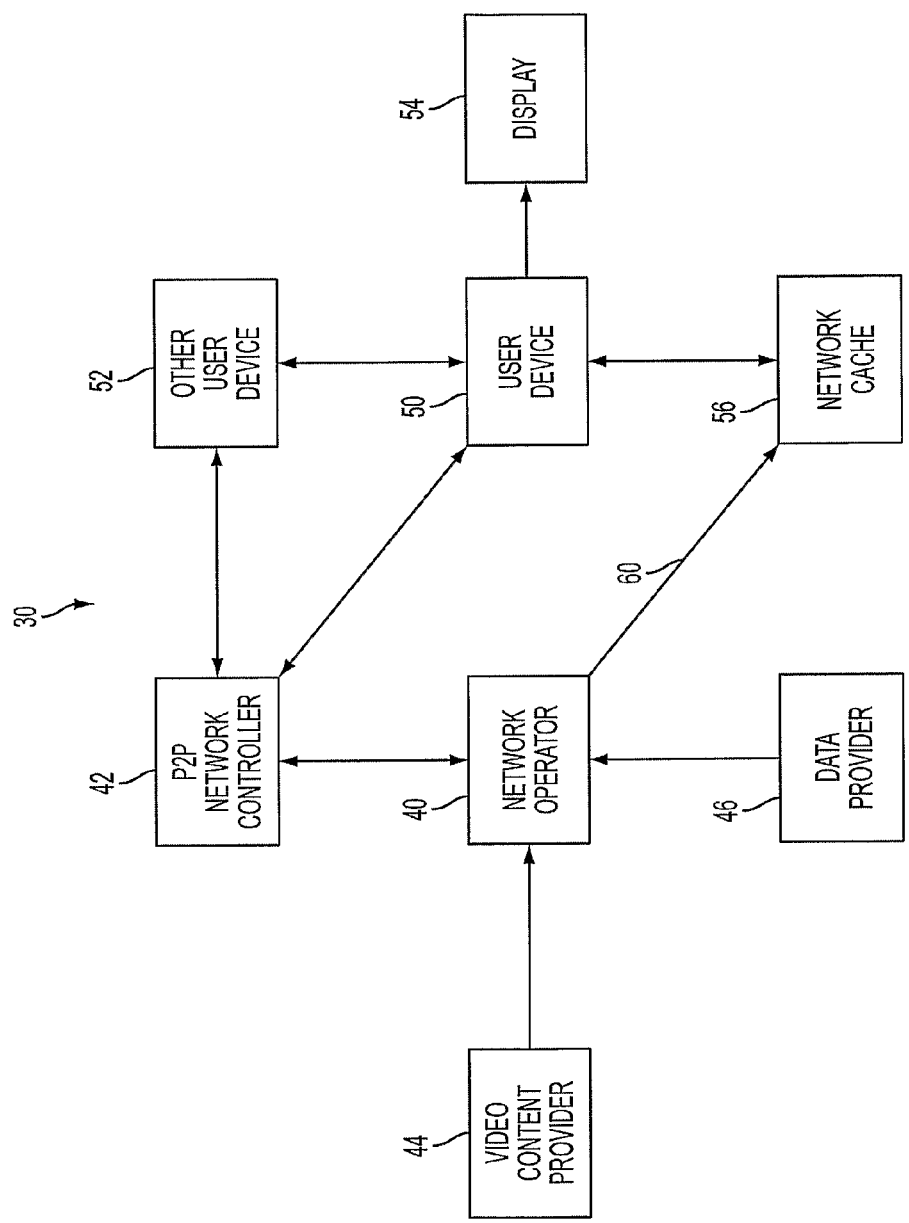
FIG. 2 is a schematic diagram of TV and data content delivery system according to an exemplary embodiment.

According to an exemplary embodiment illustrated in FIG. 2, a novel system 30 may be used for providing video content and individualized data to a user while also using hardware and/or software components which are minimizing a traffic between a network operator and the user and are cost effective. Data is understood to include ads, movies, games, etc while video content is understood to include, for example, TV content. According to an exemplary embodiment, the TV content is not related to the data. Such a system 30, as will be discussed later in more detail, may enable the delivery of personalized data (for example ad content), based on P2P technology, between various segments of the video content.

P2P networks are typically used for connecting nodes via largely ad hoc connections. Such networks are useful for many purposes. Sharing content files containing audio, video, data or anything in digital format is very common, and real-time data, such as telephony traffic, may also be passed using P2P technology.

A pure P2P network does not have the notion of clients or servers but only equal peer nodes that simultaneously function as both "clients" and "servers" to the other nodes on the network. This model of network arrangement differs from the client-server model where communication is usually to and from a central server. Early P2P networks included the Usenet news server system, in which peers communicated with one another to propagate Usenet news articles over the entire Usenet network.

When downloading content using P2P clients, pieces of the selected file may be gathered from several nodes simultaneously in order to decrease the download time and to increase the robustness of the P2P network.

For simplicity, the exemplary embodiments discussed next are described in the context of providing ad content to a TV user. However, the methods and systems discussed herein are applicable to other situations, as for example providing pictures, news, movies, or other data to a mobile device user that is capable of watching the data on a screen of the mobile device.

The system 30 shown in FIG. 2 includes a network operator 40 that is configured to communicate with a user device 50 over an IP network 60. The network operator 40 may be connected to a P2P network controller 42. The network controller 42 may be part of the network operator 40 or may belong to a third party that is different from the network operator 40. The network operator 40 is also connected to the video content provider 44 and to a data provider 46. The data provider 46 may be an ad provider or any other data provider.

The user device 50 may be connected to one or more other user devices 52. The user device 50 with the one or more user devices 52 may form the P2P network as discussed with regard to FIG. 3. In such a situation, the network controller 42 is connected to the users 50 and 52 for administering the P2P network and/or providing, among other things, tracking functions. The user device 50 may also be connected to a display 54 for displaying the content received from the network operator 40. The user device 50 may be connected to a network cache 56 for downloading desired data. The network cache 56 may be part of the network operator 40 or may be part of the P2P network, in which case it is controlled by the network controller 42. One or more of the users of the P2P network may connect to the network cache 56 for downloading desired data.

According to an exemplary embodiment, the user device 50 may be a set top box, the display 54 may be part of a TV set, the network operator 40 may be a cable company, the data provider 46 may be an ad distribution server, and the P2P network may include the user device 50 and the other user device 52. According to other exemplary embodiments, the user device 50 may be a mobile phone, a computer system, etc. and the network operator 40 may be a phone company (mobile or not).

For those exemplary embodiments that disclose providing a personalized ad to the user, a feature to be considered is that the ad content is rather static in nature. For example, an ad for a product A may remain the same for a period of time (for the duration of the ad campaign) but the ad is relevant to different viewers at different times. Also, it may be the case that the same ad is shown to the users several times during the ad campaign, i.e., the life time of the ad content in the system.

Figure 3:
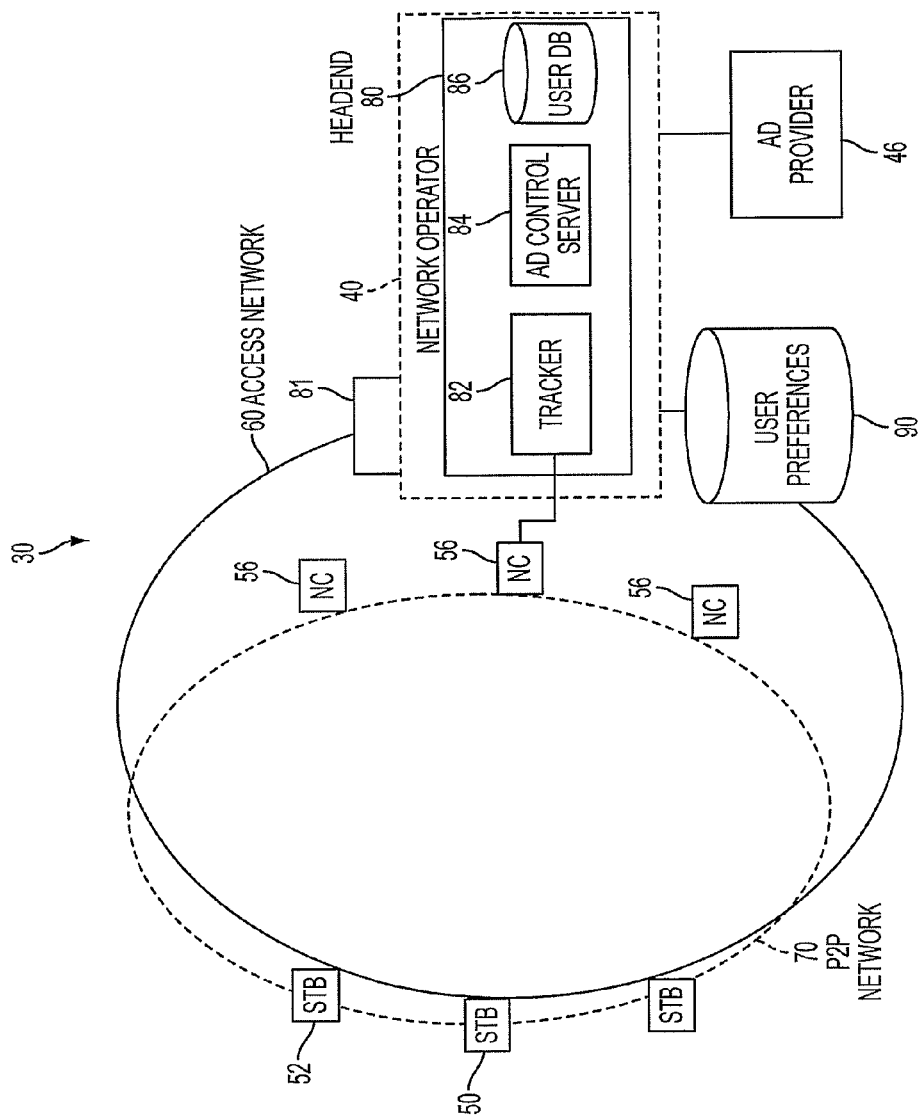
FIG. 3 is a schematic diagram of TV and ad content delivery system according to an exemplary embodiment.

A more detailed view of system 30 is shown in FIG. 3. According to the exemplary embodiment of FIG. 3, the network operator 40 is shown being connected to set top boxes 50 and 52 via the access network 60. Some or all of the set top boxes 50 and 52 are also connected to the P2P network controller 42 (not shown in FIG. 3) via the P2P network 70. In one application, the access network 60 (also called IPTV network) is different from the P2P network 70. However, in another application, the two networks 60 and 70 are the same. According to an exemplary embodiment, the P2P network controller 42, which is shown in FIG. 2, may include the tracker 82. The P2P network 70 may include, besides the users 50 and 52 and the P2P network controller 42, one or more of the network caches 56. In one application, no network cache 56 is present in the P2P network 70.

Still with regard to FIG. 3, the network operator 40 may be connected to the ad provider 46 and may include a head end 80. The head end 80 may include an interface 81 for communicating with the access network 60, a tracker 82, an ad control server 84, and a user database 86, which are discussed later.

At least three configurations of the P2P ad distribution architecture are possible. A first configuration includes clients and server(s) with no separate storage devices. The storage facilities are located at the end user devices. In this configuration the operator has not deployed any network caches but utilizes the P2P network for ad distribution. Thus, some of the users (seeds) would store the ad content and the remaining of the users would download the ad content from the users that store the ad content.

A second configuration has the storage capability provided in network caches and the users have no storage capability. This scenario applies when the user device is, for example, a set top box having no storage capability. Under this scenario, the network operator and/or ad content provider do not rely on end user devices for storage and distribution of the ads. The user devices would download the data from the network cache.

The third configuration is a hybrid in which both end user devices having a storage device as well as network caches are utilized. This is a flexible scenario and is the one illustrated in FIG. 3 and discussed next. However, one of ordinary skill in the art would appreciate that the following exemplary embodiments also apply to the other two configurations.

Some of the components of the headend 80 are discussed now in more detail. The ad control server (ACS) 84 may include the network operator's logic for controlling the access network 60 formed by the multitude of STBs 50 and 52 and network based caches 56. The ACS 84 may be configured similar to an ad content presence, from a service point of view, by combining data from the user database 86 and from the tracker 82. Those skilled in the art would recognized that in P2P networks the ad content presence or presentity is an entity described by presence information (for more details about the presentity see C. Boberg et al., Presentity Rules for Location Authorization in a Communication System, U.S. patent application Ser. No. 12/127,443, the entire disclosure of which is incorporated herein by reference). The ACS 84 is responsible for signaling the STB 50 to start downloading a specific ad from other peer STBs 52. Also, the ACS 84 may store a rule set about when and what ads the STBs should play.

Figures 4, 5:
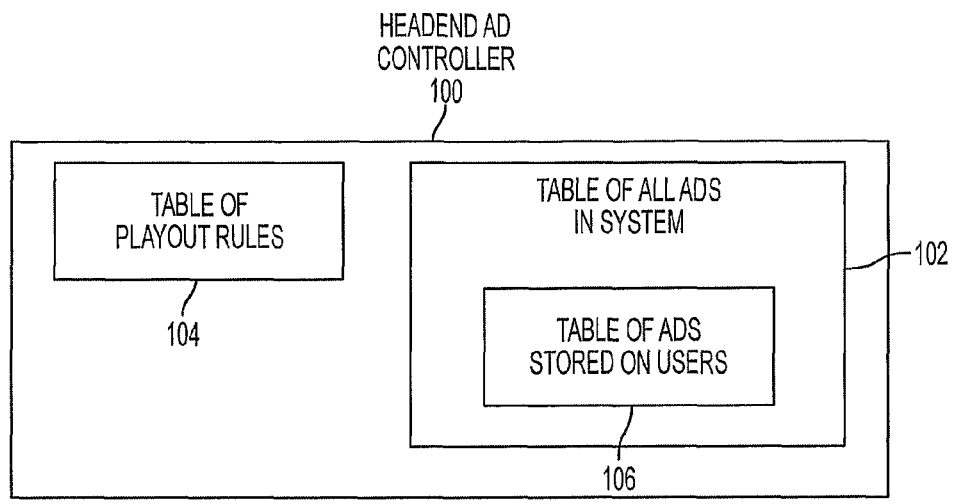
FIG. 4 is a schematic diagram of a headend ad controller according to an exemplary embodiment.
FIG. 5 is an illustration of a table stored in the headend of FIG. 4 according to an exemplary embodiment.

The ACS 84 has an ad controller 100, which is depicted in FIG. 4. The ad controller 100 may be a logical entity and may include a table 102 of all ads in the system and a table 104 of playout rules. The table 102 of all ads may include a table 106 of ads stored at the users. The table 102 of all ads keeps track of all the ads that are available in the system 30, i.e., either at the users 50 and 52 and/or at the network caches 56. The table 106 of ads keeps track of only those ads that are stored at the users 50 and 52. The table 104 of playout rules may include, at a minimum, the rules for playing the ads at the users 50 and 52. One skilled in the art would recognize that more or different tables may be used for keeping track of the existing ads, the user available ads, and the times when to play the ads.

According to an exemplary embodiment, an example of the table 104 of playout rules is illustrated in FIG. 5. The table 104, which may be maintained by the ad controller 100 and/or by the user 50, includes an identifier 108 of each ad, a time 110 when the ad should be played, and an expiry date/time 112 of each ad. The table 104 may include additional information, as for example, a number of times that an ad is to be played, an ad duration, a version of the ad to be played when, for example, the ad campaign has two versions of the ad, a short-duration version for prime time and a long-duration for the rest of the day, etc.

Figure 6:
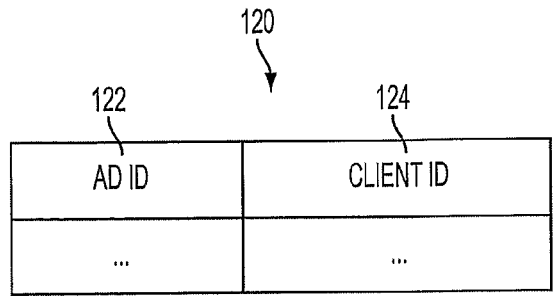
FIG. 6 is an illustration of a table stored by a user device according to an exemplary embodiment.

According to an exemplary embodiment, FIG. 6 illustrates an exemplary table 120 that may be stored at the client 50 and/or 52. The table 120 may include an ad identifier 122 and an id 124 of the client that currently holds the ad. Table 120 may be similar to that table stored in the tracker 82 but may contain information relevant to one user device while the table stored in the tracker 82 may contain information relevant to all user devices. The user device of the client 50 and/or 52 may store additional data that might be needed by the system to perform a successful delivery. Such additional data may be a PING_TIME between various components of the network and the STBs 50, e.g., for resource management, data related to the device capabilities, e.g., memory capabilities, etc., data related to statistical details on POWER_ON (what time during the day is the device on as the user of the STB might turn the device off during the night for energy conservation or other reasons).

Another component of the headend 80 is the tracker 82, shown in FIG. 3. The tracker 82 is an entity that maintains a table including the location of ad content relative to end user STBs 50 and 52. This table may be a Distributed Hash Table (DHT). The tracker 82 informs any STB 50 or 52 about which other STBs 50 and 52 have the desired ad content, i.e., a list of the peers that have a specific ad. Based on this information, a given STB 52 communicates with another STB for downloading the ad content.

According to an exemplary embodiment, the list maintained by tracker 82 may include information related to the network topology, e.g., the access network 60 and the locations of the user devices 50 and 52 and the network caches 56. Based on the network topology, the tracker 82 may provide the user device 50 with those peers that are closest in terms of geographical position or/and those users that have shortest ping times as two locations may be geographically close but belonging to different sub-networks, which makes their connection less efficient. In this way, the time and effort for downloading the ad content from a first peer to a second peer may be reduced as the first peer downloads the ad content from the closest peer. One advantage of the P2P delivery is the reduced traffic between the network operator and the user as the ad content is not provided by the network operator.

Figure 7:
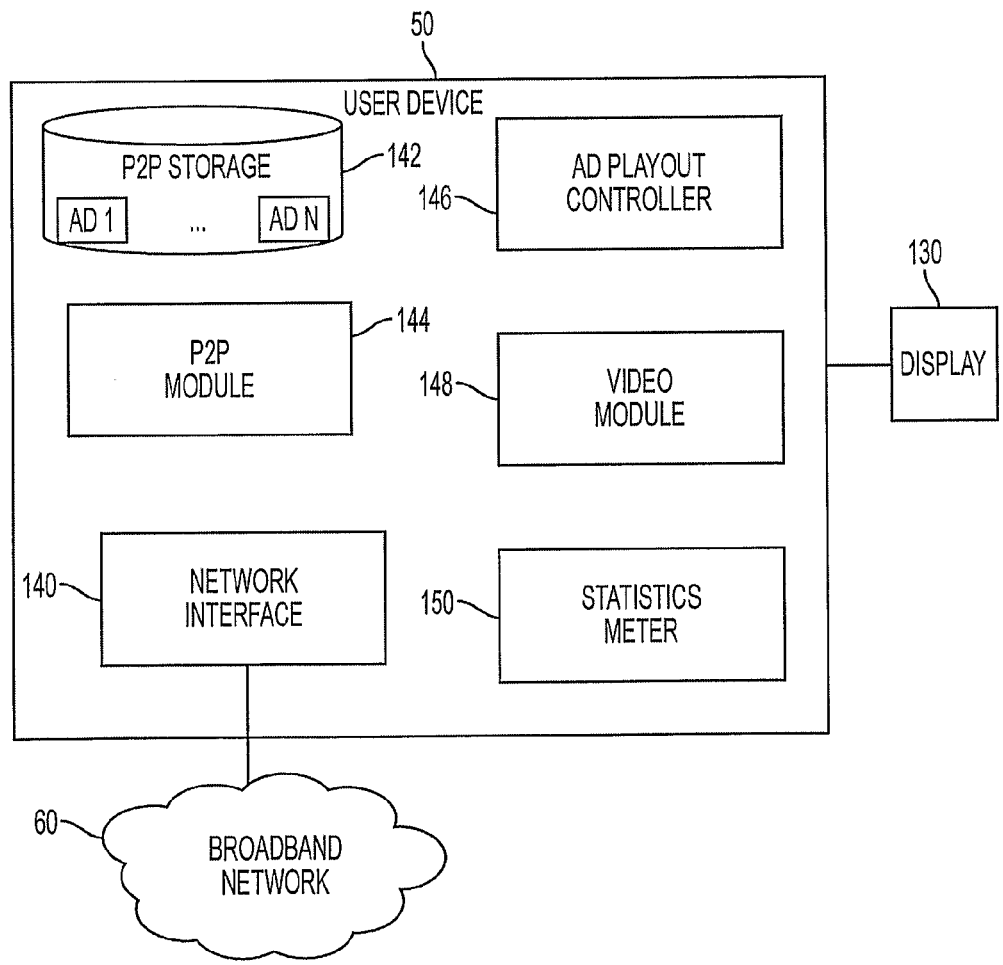
FIG. 7 is a schematic diagram of a user device according to an exemplary embodiment.

The user devices 50 and/or 52 discussed in the exemplary embodiments are assumed to be STBs for simplicity. However, any of a mobile phone, personal computer, laptop, and personal digital assistant can be a user device. The end user devices are configured, as shown in FIG. 7, to fetch, store and later display ads to the end users via a display 130, e.g., a TV. In this regard, the user device 50 may include a network interface module 140 via which the user device 50 connects to the access network 60. The access network 60 may be a broadband network. The access network 60 may be identical or different from the P2P network 70.

The user device 50 may include a storage device 142, which may be a hard drive or flash memory. The storage device 142 may be used to store P2P data, i.e., ads according to an exemplary embodiment. However, other data received from peers may be stored and later played on the display 130. The user device 50 may include a P2P module 144, which communicates with the tracker 82. The P2P module 144, in collaboration with the tracker 82, may manage fetching the ads or segments of ads. The P2P module 144 may also report to the tracker 82 when ads have been successfully downloaded from other peers.

The user device 50 may include an ad playout controller 146 that is configured to control when the ads are played out. The ad playout controller 146 may be a logical entity. The ad playout controller 146 may optionally include logic about when the ads should be fetched from the peers and/or the network caches. The user device 50 also may include a video module 148 that is responsible for controlling the stream of video data from the access network 60 to the display 130.

Moreover, the user device 50 may include a statistics meter module 150. The statistics meter module 150 may report to the user and/or the network operator 40 statistical data regarding the displayed ads. For example, the statistics meter module 150 may collect data regarding that ad A has been viewed in its entire length 80% of the time and 20% of the time the user has changed the channel after 15 seconds. This information and other may be reported by the user device 50 to the network operator 40 to be used for various purposes, i.e., better selecting the ad to be played to a certain user, which may be an extra revenue stream as the ad provider 46 would want to know more about the effectiveness of the commercials.

Figure 8:
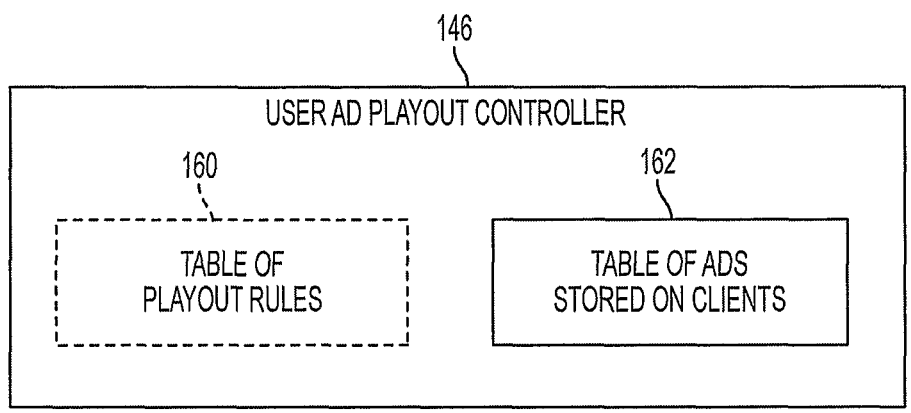
FIG. 8 is a schematic diagram of a user ad playout controller of the user device of FIG. 7 according to an exemplary embodiment.

According to an exemplary embodiment illustrated in FIG. 8, the user ad playout controller 146 may include a table 160 of playout rules. This table 160 is optional as this usually resides in the headend 80. However, it is possible that the headend 80 populates table 160 and then the headend 80 autonomously instructs the user device 50 about what content to be playout at what time. The content of the table 160 may be similar to table 104 discussed with regard to FIG. 4.

Figure 9:
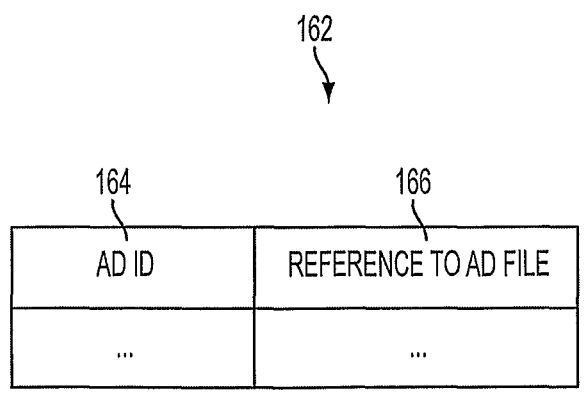
FIG. 9 is an illustration of a table stored by the user ad playout controller of FIG. 8 according to an exemplary embodiment.

The user ad playout controller 146 may also include a table 162 of ads stored at the client. The table 162 is shown in FIG. 9 and may include an identifier 164 for the ads stored by the user device 50 and a reference 166 to the ad file. The reference 166 may be the path to the file, a hash of the file or any other identifier of the file which can enable the user device 50 to fetch the file from the file system.

Another component of the system 30 is the network cache 56. The network caches 56 are storage facilities collocated with network transmission nodes, e.g., switches, Digital Subscriber Line Access Multiplexers (DSLAM), etc. An advantage of having such nodes is the increase of the availability of content in the P2P network as the network nodes are stable nodes (always online) with a large storage capacity.

Another possible component of the network operator 40 may be a storage device 90 that accommodates a database that includes user preferences. The user preferences may be pieces of data which contain the user's preferences and also data from the statistics meter 150. The user preferences may be used by the network operator 40 to determine which ads are suitable for which users. According to an exemplary embodiment, this information may be stored and/or owned by the network operator 40 or by the ad provider 46, or even partially by both entities depending on the methods used to collect the information and the business model.

The network operator 40 may include the user database (DB) 86 as shown in FIG. 3. The user DB 86 may be a list of all users of the system and their network identifiers which could be IP addresses, MAC addresses or other type of identifiers commonly used in an IPTV system. The network identifiers may be stored by the user device 50 in the P2P module 144.

Figure 10:
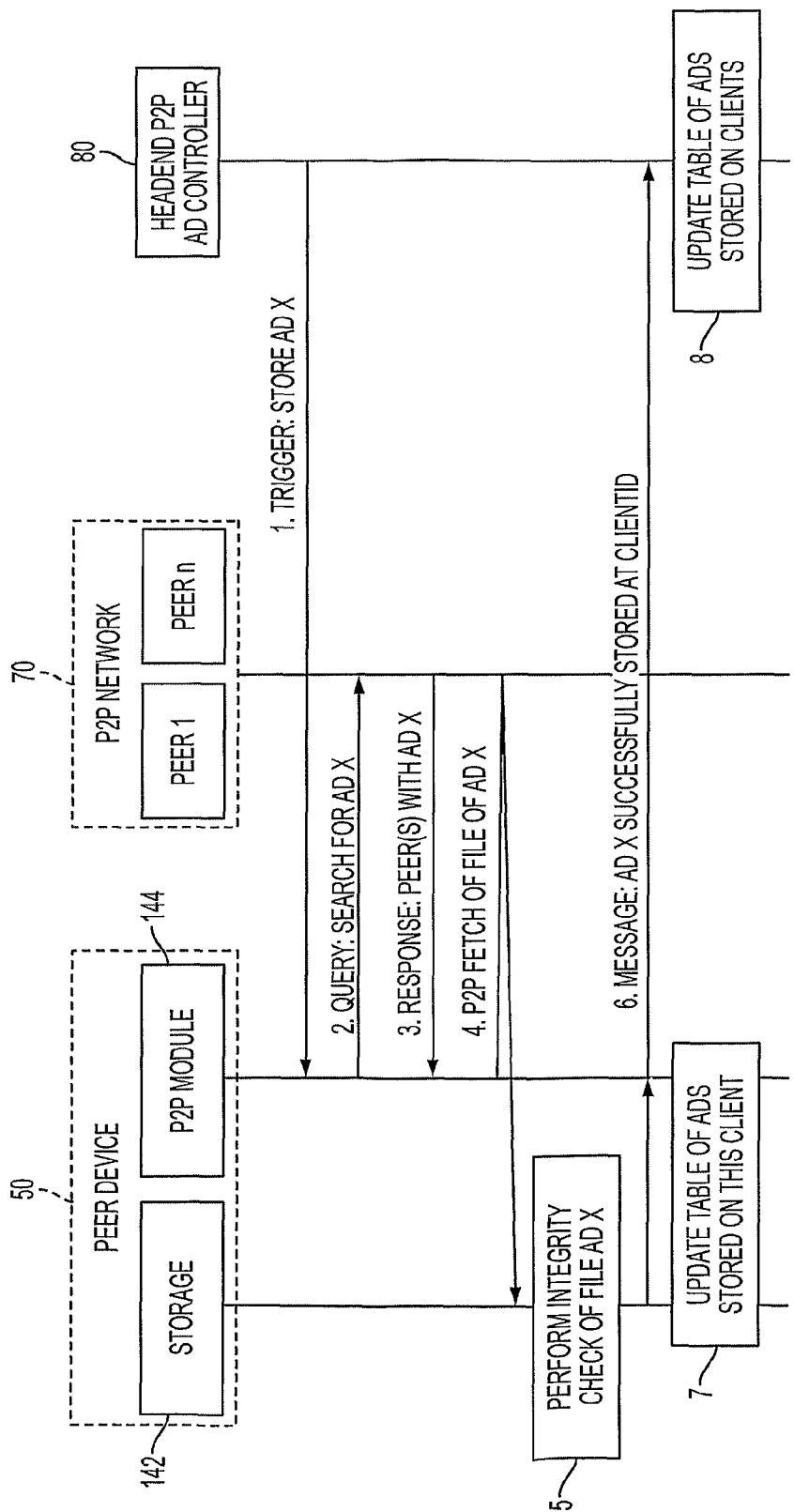
FIG. 10 is a flow chart illustrating steps of a method for fetching an ad from a peer according to an exemplary embodiment.

Having described some exemplary embodiments related to the structure of the network, network operator, user device and the connections among these components, a few exemplary methods for fetching and playing the ad content are discussed next. The methods are also applicable to other data than the ad content. FIG. 10 illustrates steps performed by the user device 50, when instructed by the network operator 40, for fetching the ad content from the P2P network 70. In step 1 the headend 80 of the network operator 40 instructs the user device 50 to look for ad X and to download it. Optionally, during this step, the headend 80 may also instruct the user device 50 where from (i.e., which peer or network cache) to download the ad X. In step 2, the user device 50 queries the P2P network 70 about the location of the ad X. In step 3, the user device 50 is informed by the P2P network 70 about the location of a peer or network cache that has the ad X. In step 4, the user device 50 fetches the file of ad X from the indicated peer or network cache and stores ad X in the storage device 142. Then, in step 5, the user device 50 performs an integrity check of the file of ad X and informs in step 6 the headend 80 that ad X has been successfully stored at the user device 50. In step 7, the user device 50 updates a corresponding table that tracks the ads stored in the user device and in step 8 the headend 80 updates a corresponding table about the ads stored at which clients. The order of the steps discussed above is not mandatory as, for example, the order of steps 7 and 8 may be reversed. Also, not all the steps discussed above have to be performed for the system to function.

According to an exemplary embodiment illustrated in FIG. 11, a method for playing the ad X fetched as shown in FIG. 10 is discussed next. In step 1, the headend 80 instructs the user device 50 to start playing the ad X. The ad playout controller 146 of the user device 50 receives this message and instructs in step 2 the video module 148 to play the file of the ad X. The video module 148 coordinates in step 3 with the storage device 142 to retrieve the ad X and with the display 130 to display the ad X. A timing of step 1 may immediately precede step 3, i.e., a time difference between steps 1 and 3 may be in the order of seconds or milliseconds. In one application, the time difference between steps 1 and 3 may be in the order of hours or days. Thus, the ads played at the user device 50 may be different from the ads played at the user device 52 at the same instant of time, achieving the personalized data distribution. In this regard, it is noted that this method may play desired ads for each user device, i.e., at a same instant of time it is possible that each user device plays a different ad from the other user devices, supposing that are enough different ads.

Figure 12:
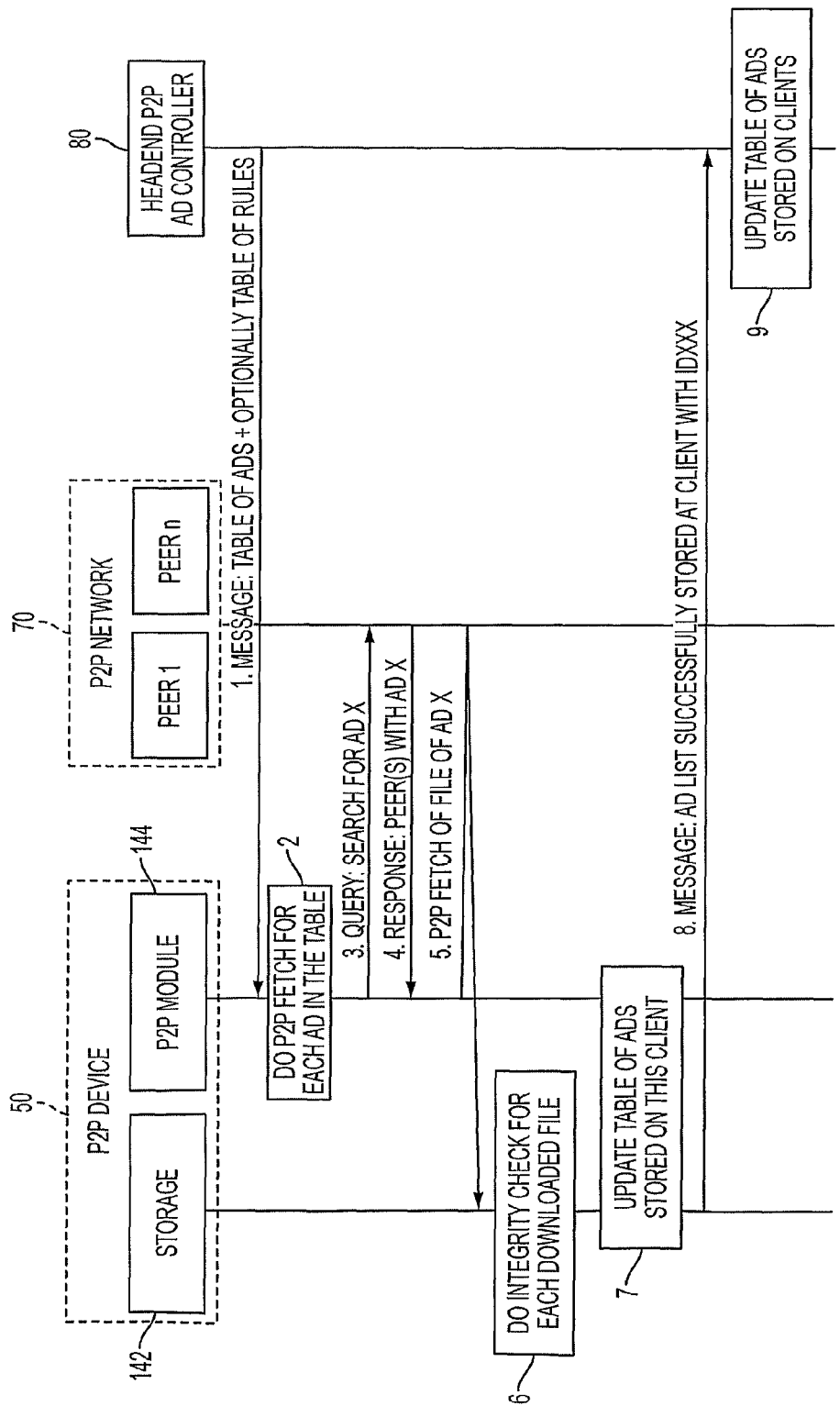
FIG. 12 is a flow chart illustrating steps of a method for fetching an ad from a peer according to an exemplary embodiment.

According to another exemplary embodiment, the user device 50 itself may decide when to fetch ad X and also when to playout ad X instead of receiving these commands from the headend 80. FIG. 12 illustrates steps of a method in which the user device 50 decides when to fetch the ad X. In this regard, FIG. 12 shows that in step 1 the headend 80 sends to the user device 50 a table of ads to be downloaded. Optionally, the headend 80 may send a table of rules (see FIGS. 5 and 8) to the user device 50. Based on the table of rules, the user device 50 decides what ad to fetch and at what time to play the ad.

Based on the table of ads received in step 1, the user device 50 decides in step 2 what ad to fetch. Supposing that the user device 50 has decided in step 2 to fetch ad X, in step 3 the user device 50 enquires the other peers 52 of the P2P network 70 about the availability of ad X. In step 4 the user device 50 receives a response from a peer(s) and in step 5, based on the response received in step 4, the user device 50 fetch the ad X from a peer or a network cache. In step 6, the user device 50 may, optionally, perform an integrity check of the downloaded ad and in step 7 the user device 50 updates the table of ads that indicates what ads are stored on the user device 50.

The user device 50 sends a message in step 8 to the headend 80 for informing that ad X has been successfully downloaded and the user device 50 may inform, optionally, the headend 80 about an identifier of ad X. Based on the message received from the user device 50 in step 8, the headend 80 updates in step 9 a table of ads indicating the ads stored at each user device. As discussed with regard to the previously figures that illustrate steps of a method, not all the steps are performed and the order of steps is not required to be the one shown in the figures. Some steps are optional and the order of steps may be changed as would be understood by one skilled in the art.

Figure 13:
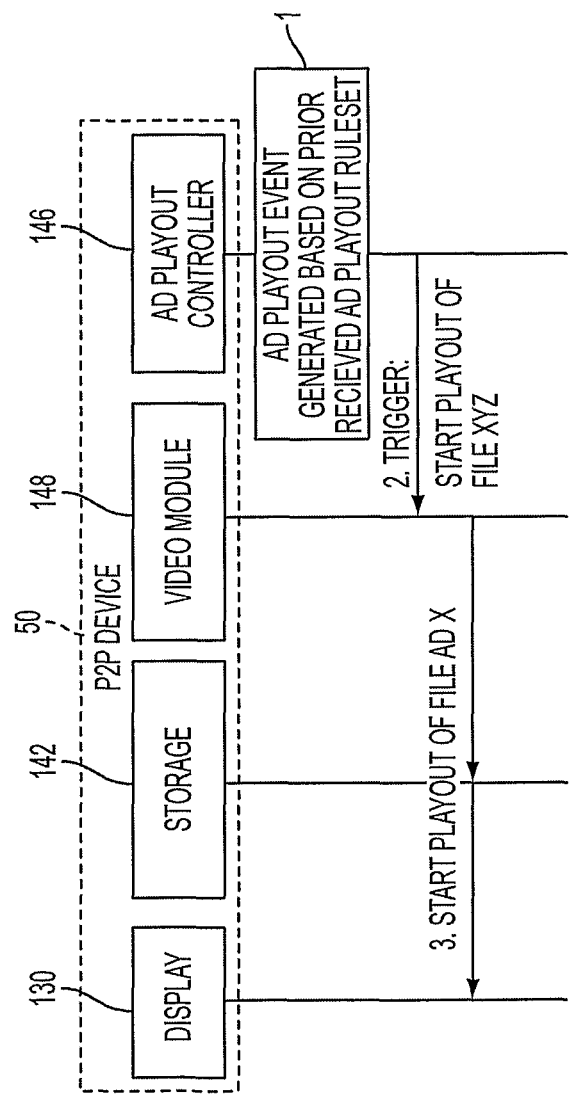
FIG. 13 is a flow chart illustrating steps of a method for playing an ad according to an exemplary embodiment.

According to another exemplary embodiment shown in FIG. 13, the user device 50, after fetching the ad X as illustrated in FIG. 12, further decides when to play the ad. As shown in FIG. 13, the ad playout controller 146 of the user device 50 may determine in step 1 when to play an ad and/or what ad to play. The ad playout controller 146 makes this determination in step 1 based on the table of playout rules 160 shown in FIG. 8. The ad playout controller 146 sends then a message in step 2 to the video module 148 to start playing out the selected ad. The video module 148 may instruct in step 3 the storage device 142 to provide the selected ad and also to send the selected ad to the display 130.

Figure 11:
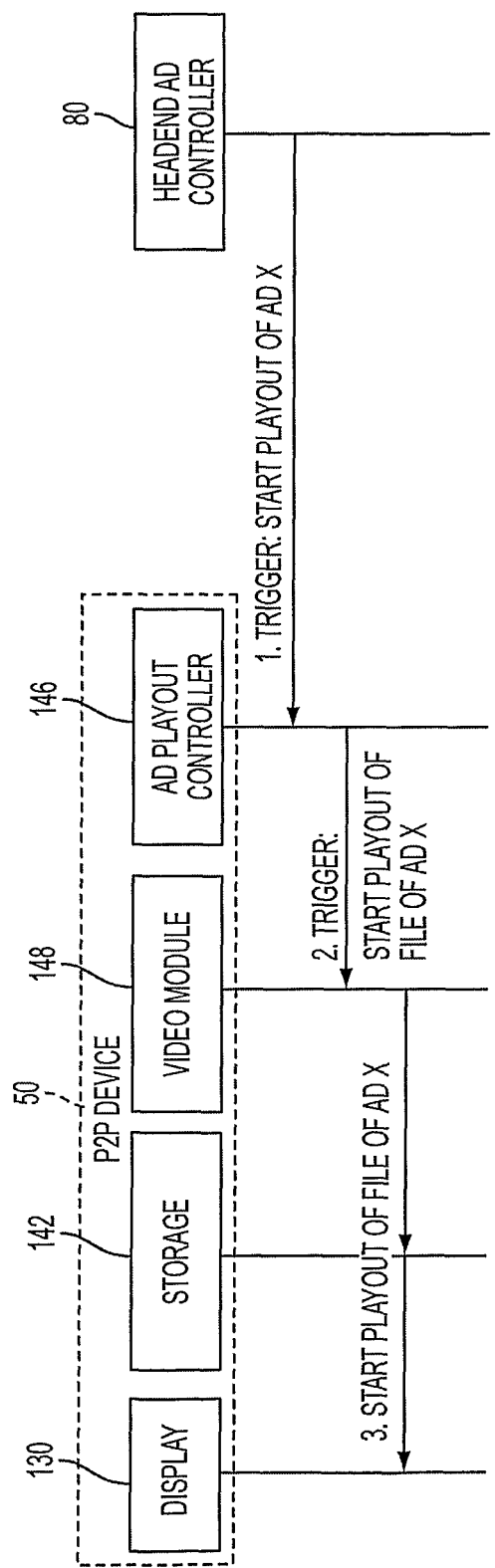
FIG. 11 is a flow chart illustrating steps of a method for playing an ad according to an exemplary embodiment.

Although the methods of FIGS. 10 and 11 and those of FIGS. 12 and 13 have been discussed above as being performed one after the other, it is noted that these methods may be mixed up. More specifically, the method shown in FIG. 10, i.e., the user device fetches the ad as instructed by the headend, may be followed by the method illustrated in FIG. 13, i.e., the user device decides what ad and when to play the selected ad. Other combinations are possible as will be recognized by one of ordinary skill in the art.

Figure 14:
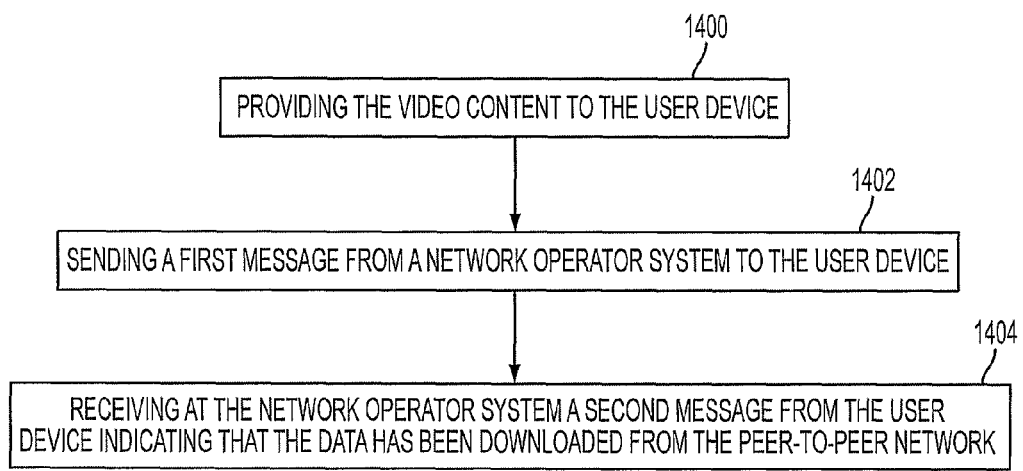
FIG. 14 is a flow chart illustrating steps of a method for providing video content and data to a user device according to an exemplary embodiment.

According to an exemplary embodiment shown in FIG. 14, there is a method for providing video content and data to a user device. The method includes a step 1400 of providing the video content to the user device, a step 1402 of sending a first message from a network operator system to the user device, the first message including at least one of an instruction for downloading the data or a table storing information about the data, where each of the instruction and the information about the data informs the user device to search a peer-to-peer network for the data, and a step 1404 of receiving at the network operator system a second message from the user device indicating that the data has been downloaded from the peer-to-peer network.

Figure 15:
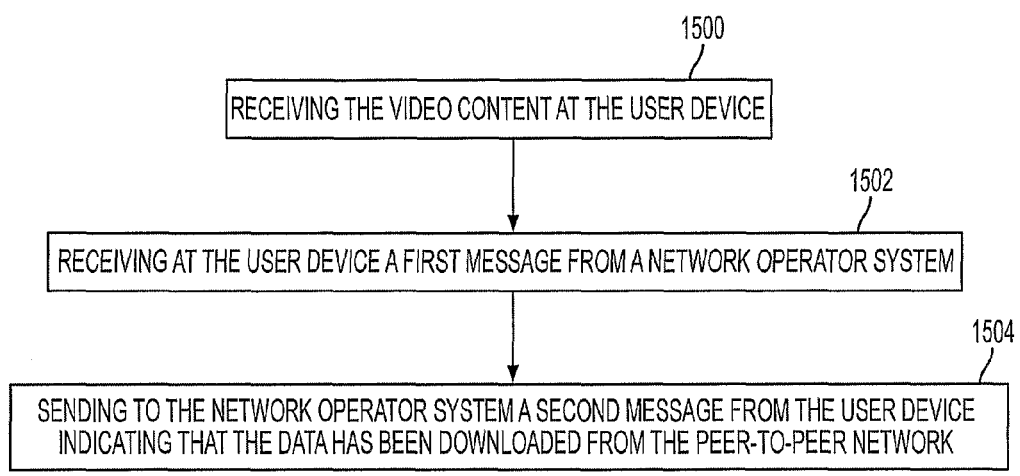
FIG. 15 is a flow chart illustrating steps of a method for receiving video content and data at a user device according to an exemplary embodiment.

According to another exemplary embodiment shown in FIG. 15, there is a method for receiving video content and data at a user device. The method includes a step 1500 of receiving the video content at the user device, a step 1502 of receiving at the user device a first message from a network operator system, the first message including at least one of an instruction for downloading the data or a table storing information about the data, where each of the instruction and the information about the data informs the user device about searching a peer-to-peer network for the data, and a step 1504 of sending to the network operator system a second message from the user device indicating that the data has been downloaded from the peer-to-peer network.

Figure 16:
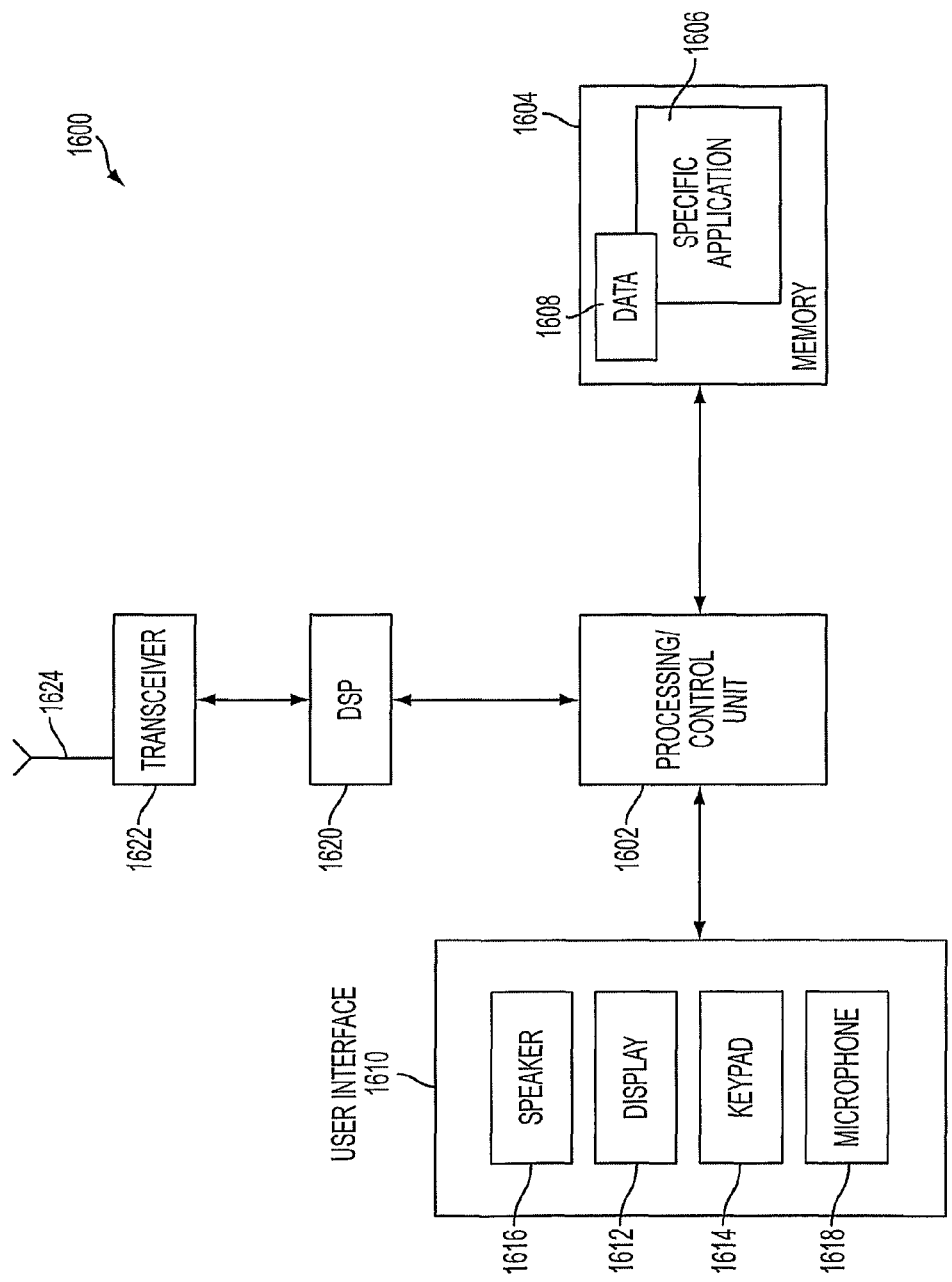
FIG. 16 is a schematic diagram of a user device and/or network operator according to an exemplary embodiment.

For purposes of illustration and not of limitation, an example of a representative computing system capable of carrying out operations in accordance with the exemplary embodiments is illustrated in FIG. 16. It should be recognized, however, that the principles of the present exemplary embodiments are equally applicable to other computing systems.

The exemplary computing system 1600 may include a processing/control unit 1602, such as a microprocessor, reduced instruction set computer (RISC), or other central processing module. The processing unit 1602 need not be a single device, and may include one or more processors. For example, the processing unit 1602 may include a master processor and associated slave processors coupled to communicate with the master processor.

The processing unit 1602 may control the basic functions of the system as dictated by programs available in the storage/memory 1604. Thus, the processing unit 1602 may execute the functions described in FIGS. 10 to 13. More particularly, the storage/memory 1604 may include an operating system and program modules for carrying out data exchanges, fetching, playing, etc. on the computing system. For example, the program storage may include one or more of read-only memory (ROM), flash ROM, programmable and/or erasable ROM, random access memory (RAM), subscriber interface module (SIM), wireless interface module (WIM), smart card, or other removable memory device, etc. The program modules and associated features may also be transmitted to the computing system 1600 via data signals, such as being downloaded electronically via a network, such as the Internet.

One of the programs that may be stored in the storage/memory 1604 is a specific program 1606. As previously described, the specific program 1606 may interact with tables 104, 106, and/or 120 stored in the memory to determine the appropriate next step of the user terminal 50 and/or headend 80. The program 1606 and associated features may be implemented in software and/or firmware operable by way of the processor 1602. The program storage/memory 1604 may also be used to store data 1608, such as the tables 104, 106, and/or 120, or other data associated with the present exemplary embodiments. In one exemplary embodiment, the programs 1606 and data 1608 are stored in non-volatile electrically-erasable, programmable ROM (EEPROM), flash ROM, etc. so that the information is not lost upon power down of the computing system 1600.

The processor 1602 may also be coupled to user interface 1610 elements associated with a mobile terminal. The user interface 1610 of the mobile terminal may include, for example, a display 1612 such as a liquid crystal display, a keypad 1614, speaker 1616, and a microphone 1618. These and other user interface components are coupled to the processor 1602 as is known in the art. The keypad 1614 may include alpha-numeric keys for performing a variety of functions, including dialing numbers and executing operations assigned to one or more keys. Alternatively, other user interface mechanisms may be employed, such as voice commands, switches, touch pad/screen, graphical user interface using a pointing device, trackball, joystick, or any other user interface mechanism.

The computing system 1600 may also include a digital signal processor (DSP) 1620. The DSP 1620 may perform a variety of functions, including analog-to-digital (ND) conversion, digital-to-analog (D/A) conversion, speech coding/decoding, encryption/decryption, error detection and correction, bit stream translation, filtering, etc. The transceiver 1622, generally coupled to an antenna 1624, may transmit and receive the radio signals associated with a wireless device.

The computing system 1600 of FIG. 16 is provided as a representative example of a computing environment in which the principles of the present exemplary embodiments may be applied. From the description provided herein, those skilled in the art will appreciate that the present invention is equally applicable in a variety of other currently known and future mobile and fixed computing environments. For example, the specific application 1606 and associated features, and data 1608, may be stored in a variety of manners, may be operable on a variety of processing devices, and may be operable in mobile devices having additional, fewer, or different supporting circuitry and user interface mechanisms. It is noted that the principles of the present exemplary embodiments are equally applicable to non-mobile terminals, i.e., landline computing systems.

Figure 17:
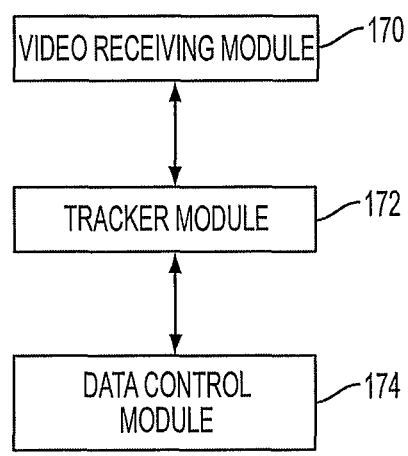
FIG. 17 is a schematic diagram of a specific structure of a processor of the user device and/or the network operator according to an exemplary embodiment.

According to an exemplary embodiment, the processor 1602 may be configured such that various modules are generated. For example, these modules, which may be logical modules, are illustrated in FIG. 17. A TV receiving module 170 may be configured to receive video content, a tracker module 172 may be configured to track the location of various ads in the P2P network 70 and may be implemented in the tracker 82, and a data control module 174 may be configured to control the distribution of ads and may be implemented as the ad control server 84.

The disclosed exemplary embodiments provide a system, a method and a computer program product for providing video content and data to a user device. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

As also will be appreciated by one skilled in the art, the exemplary embodiments may be embodied in a wireless communication device, a telecommunication network, as a method or in a computer program product. Accordingly, the exemplary embodiments may take the form of an entirely hardware embodiment or an embodiment combining hardware and software aspects. Further, the exemplary embodiments may take the form of a computer program product stored on a computer-readable storage medium having computer-readable instructions embodied in the medium. Any suitable computer readable medium may be utilized including hard disks, CD-ROMs, digital versatile disc (DVD), optical storage devices, or magnetic storage devices such as a floppy disk or magnetic tape. Other non-limiting examples of computer readable media include flash-type memories or other known memories.

Although the features and elements of the present exemplary embodiments are described in the embodiments in particular combinations, each feature or element can be used alone without the other features and elements of the embodiments or in various combinations with or without other features and elements disclosed herein. The methods or flow charts provided in the present application may be implemented in a computer program, software, or firmware tangibly embodied in a computer-readable storage medium for execution by a specifically programmed computer or processor.

What is claimed is:

1. A method for providing video content and data to a user device, the method comprising:
    providing the video content to the user device over an access network which is connected to the user device;
    sending a first message from a network operator system to the user device over the access network, the first message including at least one of an instruction for downloading the data or a table storing information about the data, wherein each of the instruction and the information about the data informs the user device to search a peer-to-peer network which is also connected to the user device for the data, wherein the peer-to-peer network is different from the access network;
    receiving at the network operator system a second message from the user device indicating that the data has been downloaded from the peer-to-peer network;
    receiving at the network operator system statistical data from the user device via a statistics meter module stored on the user device; and
    sending from the network operator system a set of rules to the user device, the set of rules including at least identities of components of the data, a time for each component of the data to be played out, and expiry dates of the components, wherein the set of rules are user customized based on a user's preferences and wherein the set of rules are user customized based on the received statistical data of the statistics meter module,
    wherein the statistical meter module sends reports of the statistical data to a user of the user device and/or to the network operator system.

2. The method of claim 1, further comprising:
    sending from the network operator system a third message instructing the user device to play the downloaded data instead of the video content at a given time.

3. The method of claim 1, wherein the data includes at least one of advertisements, video games, and movies.

4. The method of claim 1, further comprising:
    receiving at the peer-to-peer network a query from the user device regarding availability of the data; and
    sending information to the user device about other user device locations where the data is available.

5. The method of claim 1, wherein the providing step further comprises:
    providing the video content over an internet protocol TV (IPTV) network; and
    providing the data over a peer-to-peer network, which is different from the IPTV network.

6. A network operator system for providing video content and data to a user device, the system comprising:
    an interface on a computing device configured to provide the video content to the user device over an access network which is connected to the user device; and
    a processor on a computing device connected to the interface and configured to,
        send a first message to the user device over the access network, the first message including at least one of an instruction for downloading the data or a table storing information about the data, wherein each of the instruction and the information about the data informs the user device to search a peer-to-peer network which is also connected to the user device for the data, wherein the peer-to-peer network is different from the access network,
        receive a second message from the user device indicating that the data has been downloaded from the peer-to-peer network,
        receive statistical data from the user device via a statistics meter module stored on the user device; and
    send a set of rules to the user device, the set of rules including at least identities of components of the data, a time for each component of the data to be played out, and expiry dates of the components, wherein the set of rules are user customized based on a user's preferences and wherein the set of rules are user customized based on the received statistical data of the statistics meter module stored in a memory of the system,
        wherein the statistical meter module sends reports of the statistical data to a user of the user device and/or to the network operator system.

7. The system of claim 6, wherein the processor is further configured to:
    send a third message instructing the user device to play the downloaded data instead of the video content at a given time.

8. The system of claim 6, wherein the data includes at least one of advertisements, video games, and movies.

9. The system of claim 6, further comprising:
a peer-to-peer network controller connected to the processor and configured to receive a query from the user device regarding availability of the data, wherein the processor is further configured to send information to the user device about other user device locations where the data is available.

10. The system of claim 6, wherein the interface is connected to an internet protocol TV (IPTV) network and another interface is connected to a peer-to-peer network, which is different from the IPTV network.

11. A method for receiving video content and data at a user device, the method comprising:
receiving the video content at the user device over an access network which is connected to the user device;
receiving at the user device over the access network a first message from a network operator system, the first message including at least one of an instruction for downloading the data or a table storing information about the data, wherein each of the instruction and the information about the data informs the user device about searching a peer-to-peer network which is also connected to the user device for the data, wherein the peer-to-peer network is different from the access network;
sending to the network operator system a second message from the user device indicating that the data has been downloaded from the peer-to-peer network;
sending to the network operator system statistical data from the user device via a statistics meter module stored on the user device; and
receiving from the network operator system a set of rules, the set of rules including at least identities of components of the data, a time for each component of the data to be played out, and expiry dates of the components, wherein the set of rules are user customized based on a user's preferences and wherein the set of rules are user customized based on the statistical data of the statistics meter module,
wherein the statistical meter module sends reports of the statistical data to a user of the user device and/or to the network operator system.

12. The method of claim 11, further comprising:
receiving from the network operator system a third message instructing the user device to play the downloaded data instead of the video content at a given time.

13. The method of claim 11, wherein the data includes at least one of advertisements, video games, and movies.

14. The method of claim 11, further comprising:
sending to the peer-to-peer network a query from the user device regarding availability of the data;
receiving information at the user device about other user device locations where the data is available; and
retrieving the data from one or more of the user devices that are part of the peer-to-peer network or from an external server that is not part of the network operator system where the data is available.

15. The method of claim 11, further comprising:
receiving the video content over an internet protocol TV (IPTV) network; and
receiving the data over a peer-to-peer network, which is different from the IPTV network.

16. The method of claim 11, further comprising:
independently initiating retrieval of the data from the peer-to-peer network when the table storing information about the data is received.

17. The method of claim 16, further comprising:
independently playing one or more components of the data instead of the video content at given times based on the received set of rules.

18. A user device for receiving video content and data, the user device comprising:
a first interface configured to receive the video content over an access network which is connected to the user device; and
a processor connected to the first interface and configured to,
receive a first message over the access network from a network operator system, the first message including at least one of an instruction for downloading the data or a table storing information about the data, wherein each of the instruction and the information about the data informs the user device about searching a peer-to-peer network which is also connected to the user device for the data, wherein the peer-to-peer network is different from the access network,
send to the network operator system a second message indicating that the data has been downloaded from the peer-to-peer network,
send to the network operator system statistical data from the user device via a statistics meter module stored on the user device, and
receive from the network operator system a set of rules including at least identities of components of the data, a time for each component of the data to be played out, and expiry dates of the components, wherein the set of rules are user customized based on a user's preferences and wherein the set of rules are user customized based on the statistical data of the statistics meter module,
wherein the statistical meter module sends reports of the statistical data to a user of the user device and/or to the network operator system.

19. The user device of claim 18, wherein the processor is further configured to:
receive from the network operator system a third message instructing the user device to play the downloaded data instead of the video content at a given time.

20. The user device of claim 18, wherein the data includes at least one of advertisements, video games, and movies and the user device is one of a set top box, personal computer, mobile phone, and a personal digital assistant.

21. The user device of claim 18, wherein the processor is further configured to:
send to the peer-to-peer network a query regarding availability of the data;
receive information about other user device locations where the data is available; and
retrieve the data from one of the user devices that are part of the peer-to-peer network or from an external server that is not part of the network operator system where the data is available.

22. The user device of claim 18, wherein the first interface is configured to receive the video content over an internet protocol TV (IPTV) network; and the user device further comprises a second interface that is configured to receive the data over the peer-to-peer network, which is different from the IPTV network.

23. The user device of claim 18, wherein the processor is further configured to:
independently initiate retrieval of the data from the peer-to-peer network when the table storing information about the data is received.

24. The user device of claim 23, wherein the processor is further configured to:

independently play one or more components of the data instead of the video content at given times based on the received set of rules.

25. A method for receiving advertisement data files at a user device, the method comprising:
    receiving instructions from a network operator system connected to the user device to search for a specific advertisement data file and to download the specific advertisement data file;
    querying a peer-to-peer network connected to the user device for a location of the specific advertisement data file;
    receiving the location of the specific advertisement data file by the peer-to-peer network;
    retrieving the specific advertisement data file from the indicated location;
    storing the specific advertisement data file on a storage component in the user device;
    performing an integrity check of the specific advertisement data file stored on the user device;
    informing the network operator that the specific advertisement data file is stored in the user device;
    updating a table at the user device that tracks all of the advertisement data files stored in the user device; and
    updating a table at the network operator system that tracks all of the advertisement data files stored in the user device.

26. The method according to claim 25, further comprising:
    receiving instructions at a playout controller in the user device from the network operator system to play the specific advertisement data file on the user device, wherein the playout controller then instructs a video module in the user device to play the specific advertisement data file after the video module retrieves the specific advertisement data file from the storage component in the user device; and
    playing the specific advertisement data file on the user device.

27. A method for receiving advertisement data files at a user device, the method comprising:
    receiving a table of advertisement data files to be downloaded by the user device from a network operator system connected to the user device;
    deciding by the user device which specific advertisement data file in the table is to be retrieved based upon a set of rules;
    querying a peer-to-peer network connected to the user device for a location of the specific advertisement data file;
    receiving a response from at least one peer on the peer-to-peer network providing the location of the specific advertisement data file;
    retrieving and downloading the specific advertisement data file from the at least one peer to a storage component on the user device;
    performing an integrity check of the downloaded specific advertisement data file;
    updating a table of all advertisement data files stored on the user device; and
    sending a message to the network operator system that the specific advertisement data file has been downloaded and providing an identifier of the specific advertisement data file, wherein the network operator system updates its table that tracks all of the advertisement data files stored in the user device.

28. The method according to claim 27, further comprising:
    determining when to play the specific advertisement data file by a playout controller in the user device based upon a set of playout rules;
    sending instructions to a video module in the user device to play the specific advertisement data file, wherein the video module instructs the storage component in the user device to retrieve the specific advertisement data file; and
    playing the specific advertisement data file on the user device.

* * * * *